(12) United States Patent
Yamashita

(10) Patent No.: US 10,971,774 B2
(45) Date of Patent: Apr. 6, 2021

(54) BATTERY PACK, MANUFACTURING METHOD OF BATTERY PACK, AND INTERVENING MEMBER

(71) Applicant: TOYOTA JIDOSHA KABUSHIKI KAISHA, Toyota (JP)

(72) Inventor: Aki Yamashita, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 259 days.

(21) Appl. No.: 16/152,744

(22) Filed: Oct. 5, 2018

(65) Prior Publication Data
US 2019/0157729 A1 May 23, 2019

(30) Foreign Application Priority Data
Nov. 17, 2017 (JP) .............................. JP2017-222049

(51) Int. Cl.
| | |
|---|---|
| *H01M 10/50* | (2006.01) |
| *H01M 10/6555* | (2014.01) |
| *B60L 58/24* | (2019.01) |
| *B60L 50/60* | (2019.01) |
| *H01M 2/10* | (2006.01) |
| *H01M 10/613* | (2014.01) |
| *H01M 2/02* | (2006.01) |
| *H01M 10/66* | (2014.01) |
| *H01M 10/656* | (2014.01) |

(Continued)

(52) U.S. Cl.
CPC ......... *H01M 10/6555* (2015.04); *B60L 50/66* (2019.02); *B60L 58/24* (2019.02); *H01M 2/0237* (2013.01); *H01M 2/0285* (2013.01); *H01M 2/1077* (2013.01); *H01M 10/613* (2015.04); *H01M 10/625* (2015.04); *H01M 10/653* (2015.04); *H01M 10/656* (2015.04); *H01M 10/6551* (2015.04); *H01M 10/6567* (2015.04); *H01M 10/66* (2015.04)

(58) Field of Classification Search
CPC ........... H01M 10/6555; H01M 10/613; H01M 10/625; H01M 10/653; H01M 10/6551; H01M 10/656; H01M 10/6567; H01M 10/66; H01M 2/0237; H01M 2/0285; H01M 2/1077
See application file for complete search history.

(56) References Cited

U.S. PATENT DOCUMENTS

2011/0052961 A1   3/2011 Lamm et al.

FOREIGN PATENT DOCUMENTS

| DE | 10 2008 010 825 A1 | 8/2009 |
|---|---|---|
| EP | 2 955 780 A1 | 12/2015 |

(Continued)

*Primary Examiner* — Jane J Rhee
(74) *Attorney, Agent, or Firm* — Sughrue Mion, PLLC

(57) ABSTRACT

A battery pack includes: a battery module including cells and intervening members; a cooler; and a heat conductive layer provided between heat dissipation surface of the cell and a cooling surface of the cooler. The intervening member includes a second intervening portion to be provided between the heat dissipation surface and the cooling surface. The second intervening portion has a thickness and includes a communicating-passage side wall portion having a tapered shape directed outward along a direction from the heat dissipation surface toward the cooling surface. The heat conductive layer has a layer thickness that is equal to or more than the thickness of the second intervening portion and is filled in at least the communicating passage.

12 Claims, 10 Drawing Sheets

(51) Int. Cl.
*H01M 10/625* (2014.01)
*H01M 10/653* (2014.01)
*H01M 10/6551* (2014.01)
*H01M 10/6567* (2014.01)

(56) References Cited

FOREIGN PATENT DOCUMENTS

| | | |
|---|---|---|
| JP | 2014-229559 A | 12/2014 |
| JP | 2017-076526 A | 4/2017 |
| SG | 187634 A1 | 3/2013 |
| WO | 2012/013789 A1 | 2/2012 |

BATTERY PACK, MANUFACTURING METHOD OF BATTERY PACK, AND INTERVENING MEMBER

INCORPORATION BY REFERENCE

The disclosure of Japanese Patent Application No. 2017-222049 filed on Nov. 17, 2017 including the specification, drawings and abstract is incorporated herein by reference in its entirety.

BACKGROUND

1. Technical Field

The disclosure relates to a battery pack including a battery module in which a plurality of cells and a plurality of intervening members are integrated with each other and a cooler configured to cool down the cells in the battery module, a manufacturing method of the battery pack, and an intervening member.

2. Description of Related Art

For example, as a battery pack to be provided in a vehicle such as a hybrid car, a plug-in hybrid car, and an electric vehicle, there has been known a battery pack including a plurality of cells laminated on each other, a cooler configured to cool down the cells by circulating a cooling medium through the cooler, and a heat conductive member placed between the cells and the cooler. For example, such a battery pack is described in Japanese Unexamined Patent Application Publication No. 2014-229559 (JP 2014-229559 A) (see claim 1, FIG. 1, and so on in JP 2014-229559 A).

SUMMARY

In the battery pack of JP 2014-229559 A, a heat conductive member made of a metal member is used as the heat conductive member provided between the cells and the cooler. In the regard, in order to increase heat transfer from a cell to a cooler, the following battery pack is conceivable. That is, the battery pack is configured such that heat dissipation grease is filled between a heat dissipation surface of the cell and a cooling surface of the cooler so that a heat conductive layer made of the heat dissipation grease is formed between the heat dissipation surface of the cell and the cooling surface of the cooler. Further, the following battery pack is conceivable. That is, the battery pack is configured such that a plurality of intervening members is prepared in addition to the cells and the cooler and each of the intervening members is provided between adjacent cells. Further, it is also conceivable that a part of the intervening member is provided between the heat dissipation surface of the cell and the cooling surface of the cooler. In this case, it is conceivable that a communicating passage in which the heat dissipation surface is exposed is provided in the intervening member, and the heat conductive layer is filled into the communicating passage.

However, in such a battery pack including the heat conductive layer and the intervening members, in a step of forming the heat conductive layer, air (air bubble) is left in the heat conductive layer, particularly in a corner part, of the heat conductive layer, between the heat dissipation surface of the cell and a communicating-passage side wall portion forming the communicating passage of the intervening member. The air bubble also just remains in the heat conductive layer in the battery pack after the battery pack is completed. On this account, it is found that a heat transfer amount Q (W) (of the heat conductive layer) between the heat dissipation surface of the cell and the cooling surface of the cooler is decreased.

The disclosure provides a battery pack that restrains a decrease of a heat transfer amount Q of a heat conductive layer due to an air bubble, a manufacturing method of the battery pack, and an intervening member used for the battery pack.

A first aspect of the disclosure relates to a battery pack. The battery pack includes a battery module, a cooler, and a heat conductive layer. The battery module is configured such that a plurality of cells and a plurality of intervening members are integrated with each other. The cells each include a heat dissipation surface. The intervening members each include a first intervening portion to be provided between the cells adjacent to each other. The cooler is configured to cool the cells via a cooling surface of the cooler. The heat conductive layer includes a heat conductive viscous material and is provided between the heat dissipation surface and the cooling surface. The cells and the cooler are integrated with each other via the heat conductive layer. The intervening members each include a second intervening portion to be provided between the heat dissipation surface and the cooling surface. The second intervening portion has a thickness in a thickness direction from the heat dissipation surface to the cooling surface. The second intervening portion includes a communicating-passage side wall portion defining a communicating passage via which the heat dissipation surface communicates with the cooling surface. The communicating-passage side wall portion has at least one of a tapered shape and an uneven shape. The tapered shape is configured such that a sectional area of the communicating passage, in a direction perpendicular to the thickness direction of the second intervening portion, increases along a direction from the heat dissipation surface toward the cooling surface. The uneven shape is configured such that protrusion portions each extending from the corresponding heat dissipation surface toward the cooling surface and recess portions each extending from the heat dissipation surface toward the cooling surface are arranged alternately in a stripe manner. The heat conductive layer has a layer thickness that is equal to or more than the second thickness. The heat conductive layer is filled in at least the communicating passage, out of the communicating passage and a part between the second intervening portion and the cooling surface.

In the above battery pack, the communicating-passage side wall portion of the second intervening portion of the intervening member has at least the tapered shape or the uneven shape and the heat conductive layer is filled in at least the communicating passage. On this account, it is possible to achieve a battery pack that restrains a decrease of a heat transfer amount Q of a heat conductive layer due to an air bubble.

In the battery pack of the first aspect, the cells may be arranged in line. The cooling surface may be configured to extend in an arrangement direction where the cells are arranged in line. The heat conductive layer may be configured to transmit heat of the cells to the cooler. The tapered shape may be configured to be directed outward in a longitudinal direction of the second intervening portion along the direction.

In the first aspect, the communicating-passage side wall portion may have the tapered shape and the uneven shape.

In the above battery pack, the communicating-passage side wall portion of the intervening member has both the tapered shape and the uneven shape. On this account, it is possible to achieve a battery pack that further restrains a decrease of a heat transfer amount Q of a heat conductive layer due to an air bubble.

In the first aspect, the communicating-passage side wall portion may have the tapered shape with an inclination angle of 0.3° to 4° from the thickness direction of the second intervening portion.

The communicating-passage side wall portion of the intervening member has the tapered shape with an inclination angle θ of 0.3° to 4°. Thus, an air bubble is restrained appropriately from remaining in a part inside the communicating passage of the heat conductive layer, thereby making it possible to appropriately restrain a decrease of the heat transfer amount Q of the heat conductive layer due to the air bubble.

A second aspect of the disclosure relates to a manufacturing method of a battery pack. The manufacturing method includes: forming a battery module such that a plurality of cells and a plurality of intervening members are arranged alternately such that a first intervening portion of each of the intervening members is provided between the cells adjacent to each other and heat dissipation surface of the cell is exposed in communicating passage of the intervening member, and the cells and the intervening members are integrated with each other; forming, on a cooling surface of a cooler, a heat conductive viscous film including a heat conductive viscous material and having a film thickness; and forming a heat conductive layer such that the cells and the cooler are integrated with each other via the heat conductive layer. The heat conductive layer is formed such that: the battery module is put on the cooler on which the heat conductive viscous film is formed, in such a posture that the heat dissipation surface exposed in the communicating passage faces the cooling surface; the heat conductive viscous film is pressed against the heat dissipation surface exposed in the communicating passage; and the heat conductive viscous material making contact with the heat dissipation surface and respective communicating-passage side wall portion of the intervening member is moved in a direction from the heat dissipation surface to the cooling surface along the heat dissipation surface and the communicating-passage side wall portion, such that the communicating passage is filled with the heat conductive viscous material. The intervening members each include a second intervening portion to be provided between the heat dissipation surface and the cooling surface. The second intervening portion has a thickness in a thickness direction from the heat dissipation surface to the cooling surface. The second intervening portion includes the communicating-passage side wall portion defining the communicating passage via which the heat dissipation surface communicates with the cooling surface. The communicating-passage side wall portion has at least one of a tapered shape and an uneven shape, the tapered shape being configured such that a sectional area of the communicating passage, in a direction perpendicular to the thickness direction of the second intervening portion, increases along a direction from the heat dissipation surface toward the cooling surface, the uneven shape being configured such that protrusion portions each extending from the heat dissipation surface toward the cooling surface and recess portions each extending from the heat dissipation surface toward the cooling surface are arranged alternately in a stripe manner. The heat conductive layer has a layer thickness that is equal to or more than the thickness. The heat conductive layer is filled in at least the communicating passage, out of the communicating passage and a part between the second intervening portion and the cooling surface. The film thickness is thicker than the layer thickness.

The manufacturing method includes forming of the module (a module forming step), forming of the heat conductive viscous film (a film forming step), and integrating of the cells with the cooler (an integration step). The communicating-passage side wall portion of the second intervening portion of the intervening member has at least either of the tapered shape and the uneven shape. In the integration step, the heat conductive viscous film is pressed against the heat dissipation surface, of the cell, that is exposed in the communicating passage of the intervening member, and the heat conductive viscous material making contact with the heat dissipation surface and the communicating-passage side wall portion having at least the tapered shape or the uneven shape is moved toward the cooling surface side along the heat dissipation surface and the communicating-passage side wall portion having at least the tapered shape or the uneven shape. On this account, even if an air bubble is left in the communicating passage, the air bubble easily moves toward the cooling surface side along with the movement of the heat conductive viscous material, so that the air bubble can hardly remain in the heat conductive viscous material filled in the communicating passage. On this account, it is possible to restrain the air bubble from remaining in a part of the heat conductive layer inside the communicating passage and to restrain the decrease of the heat transfer amount Q of the heat conductive layer due to the air bubble.

In the second aspect, the cells may be arranged in line. The cooling surface may be configured to extend in an arrangement direction where the cells are arranged in line. The heat conductive layer may be configured to transmit heat of the cells to the cooler. The tapered shape may be configured to be directed outward in a longitudinal direction of the second intervening portion along the direction from the corresponding heat dissipation surface toward the cooling surface.

In the second aspect, the communicating-passage side wall portion may have the tapered shape and the uneven shape.

The communicating-passage side wall portion of the intervening member has both the tapered shape and the uneven shape. Hereby, the heat conductive viscous material making contact with the heat dissipation surface and the communicating-passage side wall portion having the tapered shape and the uneven shape is further easily moved toward the cooling surface side along the heat dissipation surface and the communicating-passage side wall portion having both the tapered shape and the uneven shape. Along with this, the air bubble is further easily moved toward the cooling surface side. On this account, it is possible to further restrain the air bubble from remaining in a part of the heat conductive layer inside the communicating passage and to further restrain the decrease of the heat transfer amount Q of the heat conductive layer due to the air bubble.

In the second aspect, the communicating-passage side wall portion may have the tapered shape with an inclination angle of 0.3° to 4° from the thickness direction of the second intervening portion.

When the communicating-passage side wall portion of the intervening member is formed in a tapered shape having an inclination angle of less than 0.3°, the heat conductive viscous material can hardly move toward the cooling surface side along the heat dissipation surface and the communicating-passage side wall portion in the integration step. In the meantime, it is found that, even when the communicating-passage side wall portion of the intervening member is formed in a tapered shape having an inclination angle of larger than 4°, the heat conductive viscous material can hardly move toward the cooling surface side along the heat dissipation surface and the communicating-passage side wall portion. In this regard, in the manufacturing method, the communicating-passage side wall portion of the intervening member is formed in a tapered shape having an inclination angle of 0.3° to 4°. Hereby, the heat conductive viscous material can easily move appropriately toward the cooling surface side along the heat dissipation surface and the communicating-passage side wall portion in the integration step, so that an air bubble can hardly remain in the heat conductive viscous material filled in the communicating passage. On this account, it is possible to restrain the air bubble from remaining in a part of the heat conductive layer inside the communicating passage and to appropriately restrain the decrease of the heat transfer amount Q of the heat conductive layer due to the air bubble.

A third aspect of the disclosure relates to an intervening member. The intervening member includes a first intervening portion and a second intervening portion. The first intervening portion is provided between adjacent cells. The cells each include a heat dissipation surface. The second intervening portion is provided between the heat dissipation surface and a cooling surface of a cooler. The second intervening portion includes a communicating-passage side wall portion defining a communicating passage via which the heat dissipation surface communicates with the cooling surface. The communicating-passage side wall portion has at least one of a tapered shape and an uneven shape. The tapered shape is configured such that a sectional area of the communicating passage, in a direction perpendicular to the thickness direction of the second intervening portion, increases along a direction from the heat dissipation surface toward the cooling surface. The uneven shape is configured such that protrusion portions each extending from the heat dissipation surface toward the cooling surface and recess portions each extending from the heat dissipation surface toward the cooling surface are arranged alternately in a stripe manner.

The communicating-passage side wall portion of the intervening member includes at least either of the tapered shape and the uneven shape. When a battery pack is manufactured by use of the intervening member, it is possible to manufacture the battery pack that restrains the decrease of the heat transfer amount Q of the heat conductive layer due to an air bubble, as described above.

In the third aspect, the tapered shape may be configured to be directed outward in a longitudinal direction of the second intervening portion along the direction.

In the third aspect, the communicating-passage side wall portion may have the tapered shape and the uneven shape.

The communicating-passage side wall portion of the intervening member has both the tapered shape and the uneven shape. On this account, when a battery pack is manufactured by use of the intervening member, it is possible to manufacture the battery pack that further restrains the decrease of the heat transfer amount Q of the heat conductive layer due to an air bubble, as described above.

In the third aspect, the communicating-passage side wall portion may have the tapered shape with an inclination angle of 0.3° to 4° from the thickness direction of the second intervening portion.

The communicating-passage side wall portion of the intervening member is formed in a tapered shape having an inclination angle θ of 0.3° to 4°. On this account, when a battery pack is manufactured by use of the intervening member, it is possible to manufacture the battery pack that appropriately restrains the decrease of the heat transfer amount Q of the heat conductive layer due to an air bubble, as described above.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
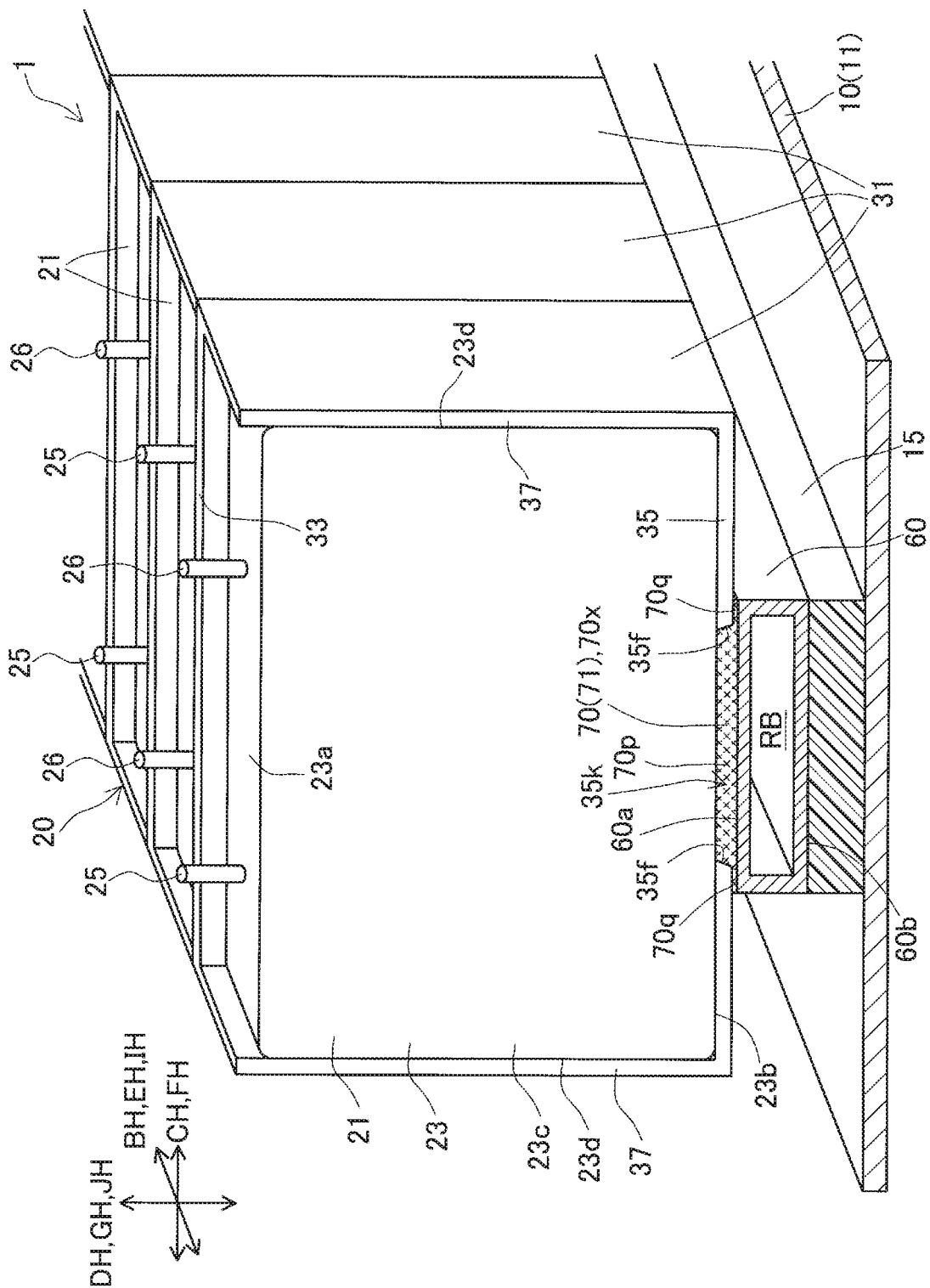
FIG. 1 is a perspective view of a battery pack according to an embodiment.
Figure 2:
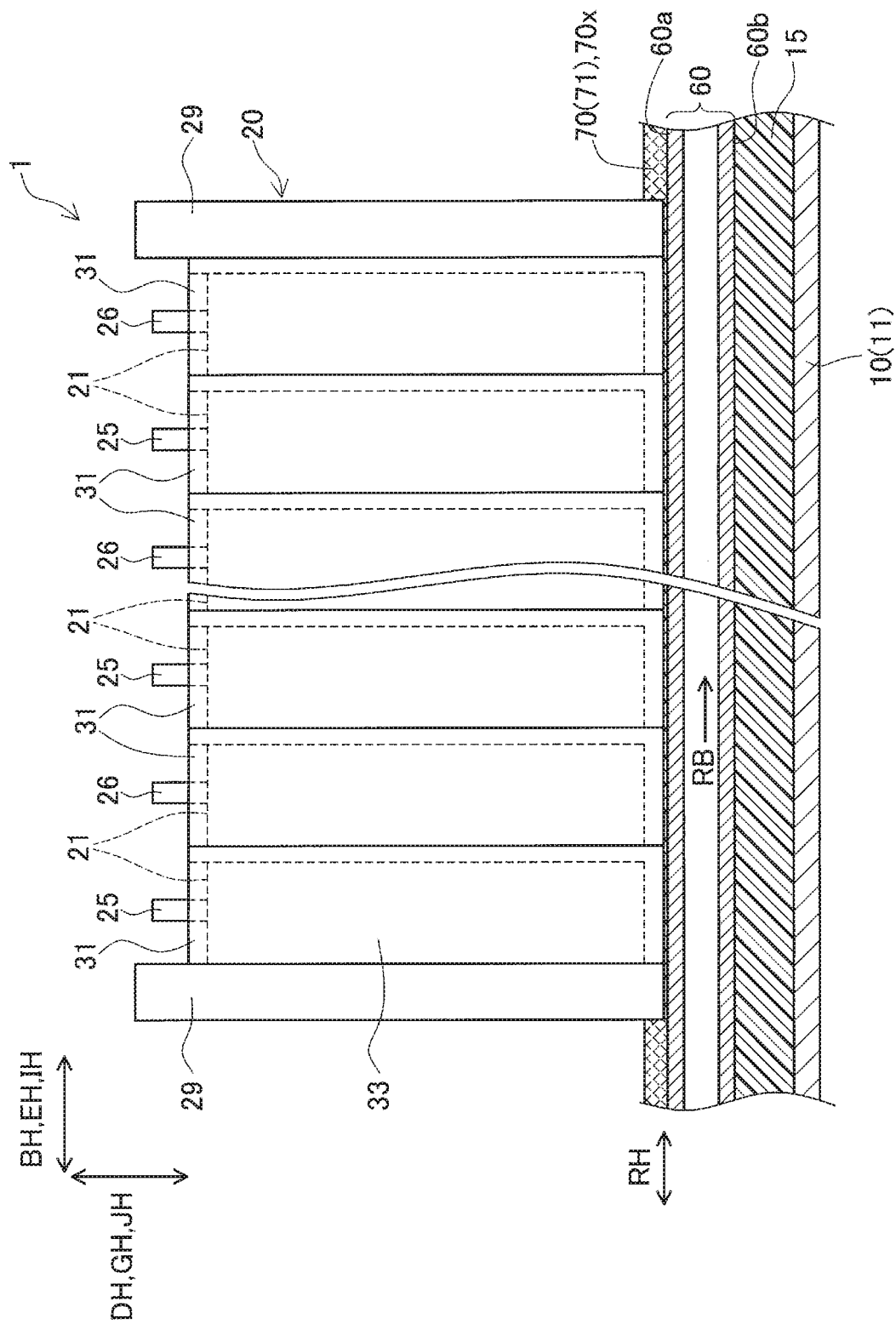
FIG. 2 is a partial exploded sectional view of the battery pack of the embodiment along the arrangement direction and the vertical direction.
Figure 3:
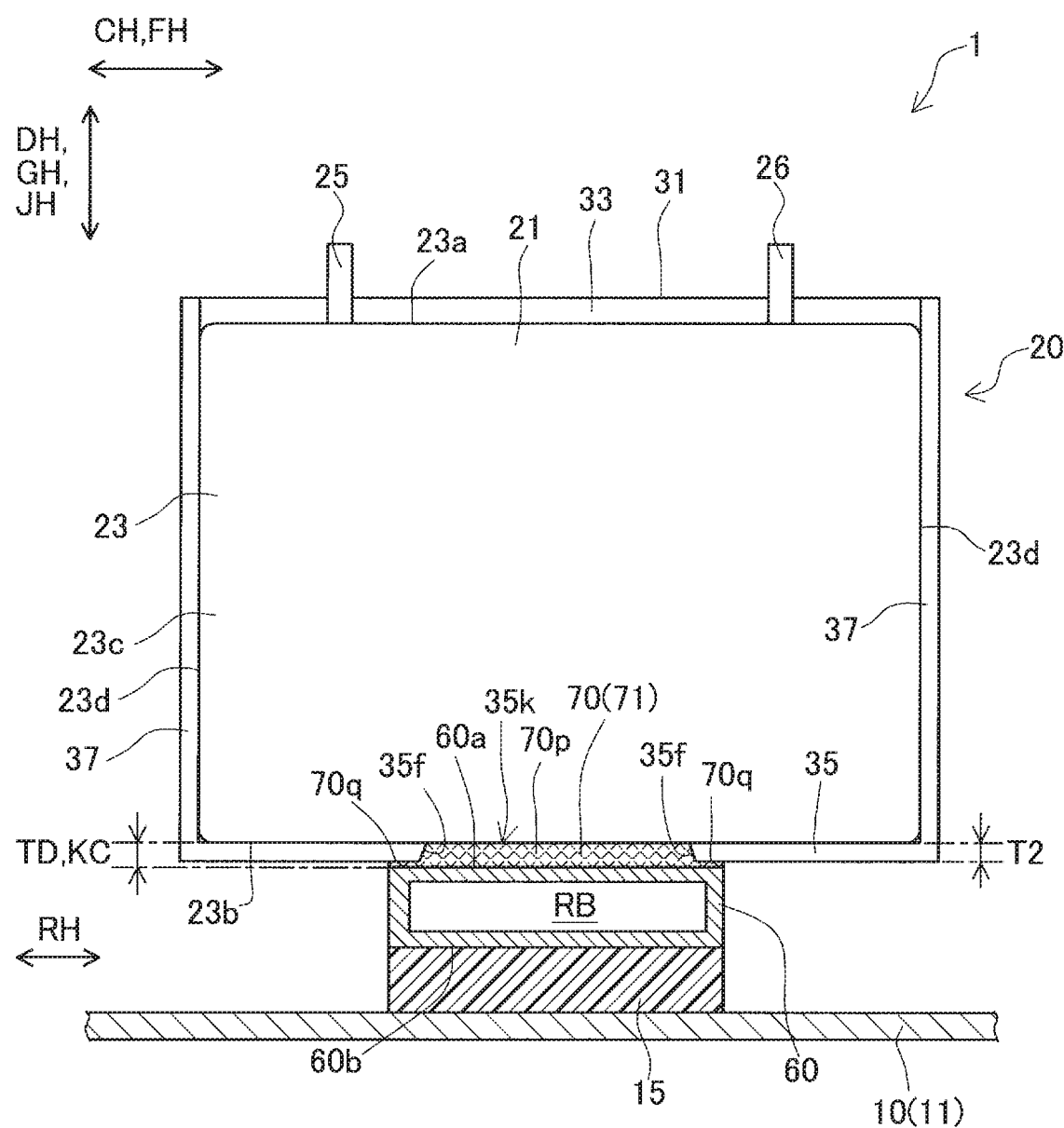
FIG. 3 is a sectional view of the battery pack of the embodiment along the lateral direction and the vertical direction.
Figure 4:
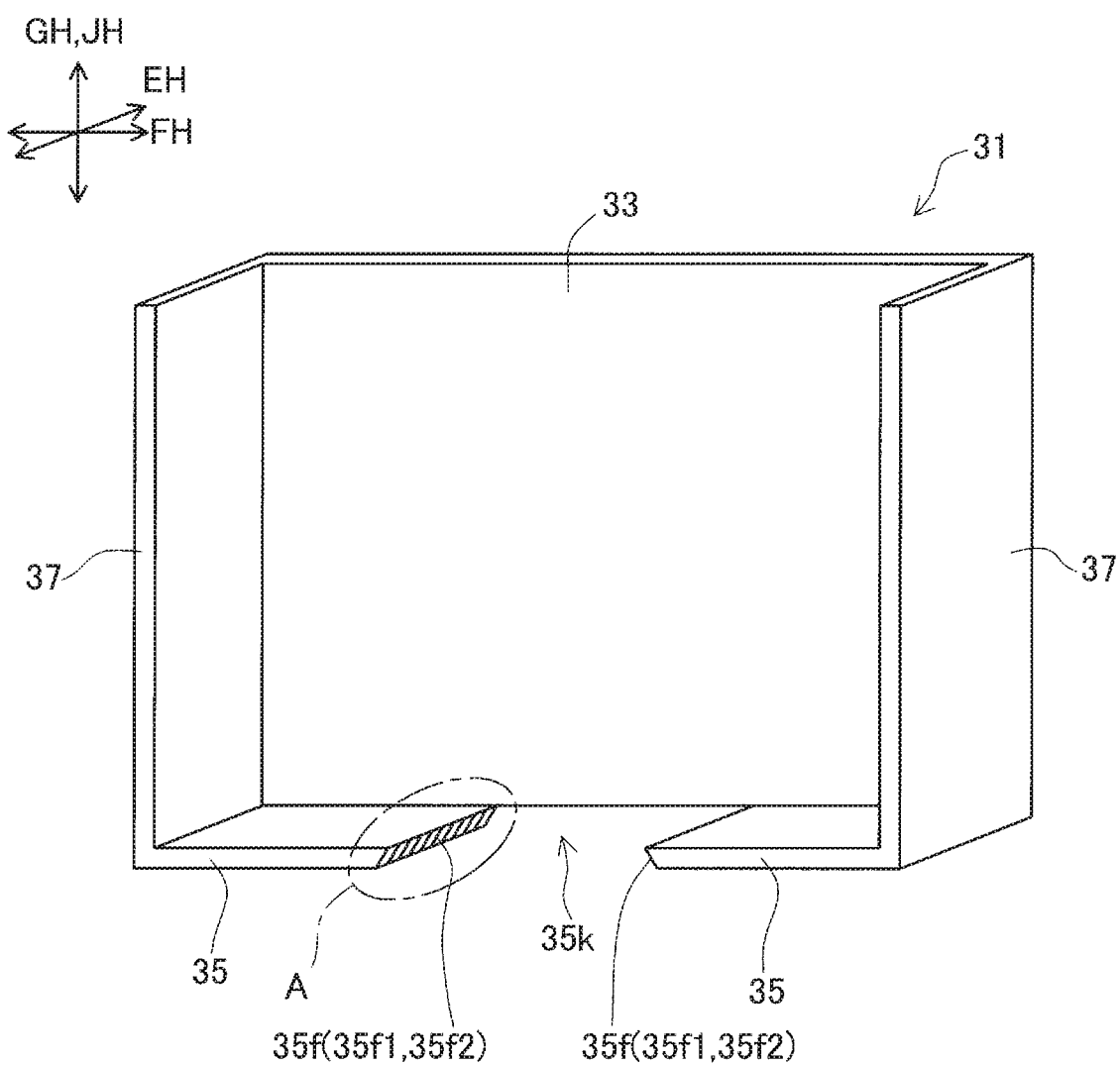
FIG. 4 is a perspective view of an intervening member according to the embodiment.

An embodiment of the disclosure will be described below with reference to the drawings. FIGS. 1 to 3 each illustrate a perspective view or a sectional view of a battery pack 1 according to the present embodiment. Note that the following description will be made such that an arrangement direction BH, a lateral direction CH, and a vertical direction DH of the battery pack 1 are defined as directions illustrated in FIGS. 1 to 3. The battery pack 1 is an in-vehicle battery pack to be provided in a vehicle such as an electric vehicle and a plug-in hybrid car. The battery pack 1 includes a battery pack case 10, a battery module 20 accommodated in the battery pack case 10 and configured such that a plurality of cells 21 and a plurality of intervening members 31 are integrated with each other, and a cooler 60 accommodated in the battery pack case 10 and configured to cool down the cells 21 included in the battery module 20. Further, a heat conductive layer 70 is provided between bottom faces (heat dissipation surfaces) 23b of the cells 21 included in the battery module 20 and a cooling surface 60a of the cooler 60, and the cells 21 of the battery module 20 and the cooler 60 are integrated with each other via the heat conductive layer 70.

Among them, the battery pack case 10 is made of aluminum and includes a lower case 11 and an upper case (not shown) fixed to the lower case 11. The battery module 20 is configured such that the cells 21 having a square shape and the intervening members 31 are laminated alternately, and end plates 29 are placed on the opposite sides in the laminating direction (the arrangement direction BH) so as to sandwich the cells 21 and the intervening members 31 therebetween. They are restricted by a plurality of restraint members (not shown) provided over the end plates 29 in a pressed state in the arrangement direction BH so that they are integrated with each other.

The cell 21 is an encapsulated-type lithium ion secondary battery having a rectangular-solid shape. The cells 21 included in the battery module 20 are arranged in a cell-thickness direction IH. The cells 21 are connected in series to each other by a bus bar (not shown). The cell 21 is configured such that an electrode body (not shown) and an electrolytic solution (not shown) are accommodated inside a cell case 23 having a rectangular box shape and made of metal (aluminum in the present embodiment). The electrode body is configured such that a belt-shaped positive plate and a belt-shaped negative plate are laminated via a pair of belt-shaped separators and are wound into a flat shape. The cell case 23 has a top face 23a, a bottom face 23b, a pair of first side faces 23c with a large area, and a pair of second side faces 23d with a small area. Note that, in the present embodiment, the bottom face 23b of the cell case 23 corresponds to the "heat dissipation surface."

A positive terminal member 25 made of aluminum and a negative terminal member 26 made of copper are provided on the top face 23a of the cell case 23 in a projecting manner in a state where they are insulated from the cell case 23. The positive terminal member 25 is connected to the positive plate of the electrode body inside the cell case 23 in a conductive manner and penetrates through the top face 23a of the cell case 23 so as to extend outside the cell. Further, the negative terminal member 26 is connected to the negative plate of the electrode body inside the cell case 23 in a conductive manner and penetrates through the top face 23a of the cell case 23 so as to extend outside the cell.

Next will be described the intervening member 31 (see FIGS. 4, 5A, 5B, and 5C in addition to FIGS. 1 to 3). Note that the following description will be made such that a thickness direction EH, a lateral direction FH, and a vertical direction GH of the intervening member 31 are defined as directions illustrated in FIG. 4 and so on. The intervening member 31 is made of insulating resin in an integrated manner. The intervening member 31 is constituted by a plate-shaped first intervening portion 33 expanding in the lateral direction FH and the vertical direction GH, a plate-shaped second intervening portion 35 expanding in the thickness direction EH and the lateral direction FH, and a pair of plate-shaped third intervening portions 37 expanding in the thickness direction EH and the vertical direction GH.

The first intervening portion 33 and the second intervening portion 35 are connected such that a lower end (the lower side in FIG. 4), in the vertical direction GH, of the first intervening portion 33 is connected to a first end (the upper right side in FIG. 4), in the thickness direction EH, of the second intervening portion 35. Further, the first intervening portion 33 and the third intervening portions 37 are connected such that opposite ends (the right side and the left side in FIG. 4), in the lateral direction FH, of the first intervening portion 33 are connected to respective first ends (the upper right side in FIG. 4), in the thickness direction EH, of the third intervening portions 37. Further, the second intervening portion 35 and the third intervening portions 37 are connected such that opposite ends (the right side and the left side in FIG. 4), in the lateral direction FH, of the second intervening portion 35 are connected to respective lower ends (the lower side in FIG. 4), in the vertical direction GH, of the third intervening portions 37.

The first intervening portion 33 is a part making contact with the whole first side face 23c with a large area in the cell 21, and in a state where the battery module 20 is formed, the first intervening portion 33 is provided between respective first side faces 23c of the cells 21 adjacent to each other. Further, the second intervening portion 35 is a part making contact with the bottom face 23b of the cell 21, and in a state where the battery module 20 and the battery pack 1 are formed, the second intervening portion 35 is provided between the bottom face 23b of the cell 21 and the cooling surface 60a of the cooler 60. Further, the third intervening portions 37 are parts making contact with the second side faces 23d with a small area in the cell 21 so as to cover the second side faces 23d from outside.

Among them, a second thickness T2 (thickness) that is a thickness of the second intervening portion 35 (the dimension, in a thickness direction JH, that connects the bottom face 23b of the cell 21 to the cooling surface 60a of the cooler 60 (described later)) is set to T2=1.5 mm. Further, the second intervening portion 35 is provided with a communicating passage 35k having a notch shape so that the bottom face 23b of the cell 21 communicates with the cooling surface 60a of the cooler 60 via the communicating passage 35k. The communicating passage 35k is formed in a rectangular shape in a plan view so as to be provided in a central part, in the lateral direction FH, of the second intervening portion 35 over the thickness direction EH.

The second intervening portion 35 has a pair of communicating-passage side wall portions 35f forming the communicating passage 35k, and the communicating-passage side wall portions 35$f$ have a tapered shape directed outward (the right side and the left side in FIG. 4) in a cooling-surface direction RH along the cooling surface 60$a$ (in the thickness direction EH and the lateral direction FH of the intervening member 31, the arrangement direction BH and the lateral direction CH of the battery pack 1) as they go from the bottom face 23$b$ of the cell 21 toward the cooling surface 60$a$ side of the cooler 60. In other words, the communicating-passage side wall portions 35$f$ have a tapered shape directed outward in the longitudinal direction of the second intervening portion as they go from the heat dissipation surface 23$b$ toward the cooling surface 60$a$. An inclination angle $\theta$ of the tapered shape is 0.3° to 4° ($\theta$=3.0° in the present embodiment).

Figure 5:
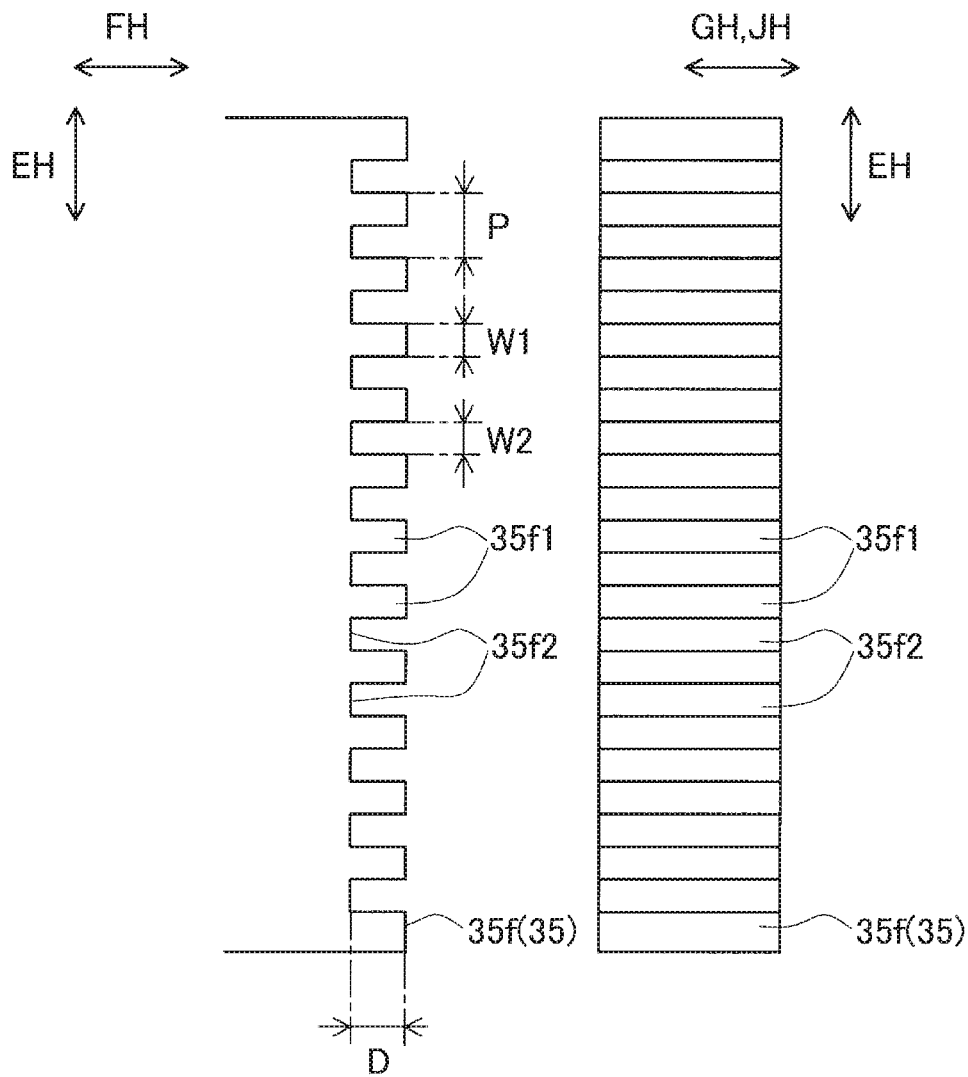
FIG. 5A is a partial plan view of a broken line part A of FIG. 4 along the lateral direction and the thickness direction in the intervening member according to the embodiment.
FIG. 5B is a partial plan view of the broken line part A of FIG. 4 along the vertical direction and the thickness direction in the intervening member according to the embodiment.
FIG. 5C is a partial plan view of the broken line part A of FIG. 4 along the lateral direction and the vertical direction in the intervening member according to the embodiment.
Figure 6:
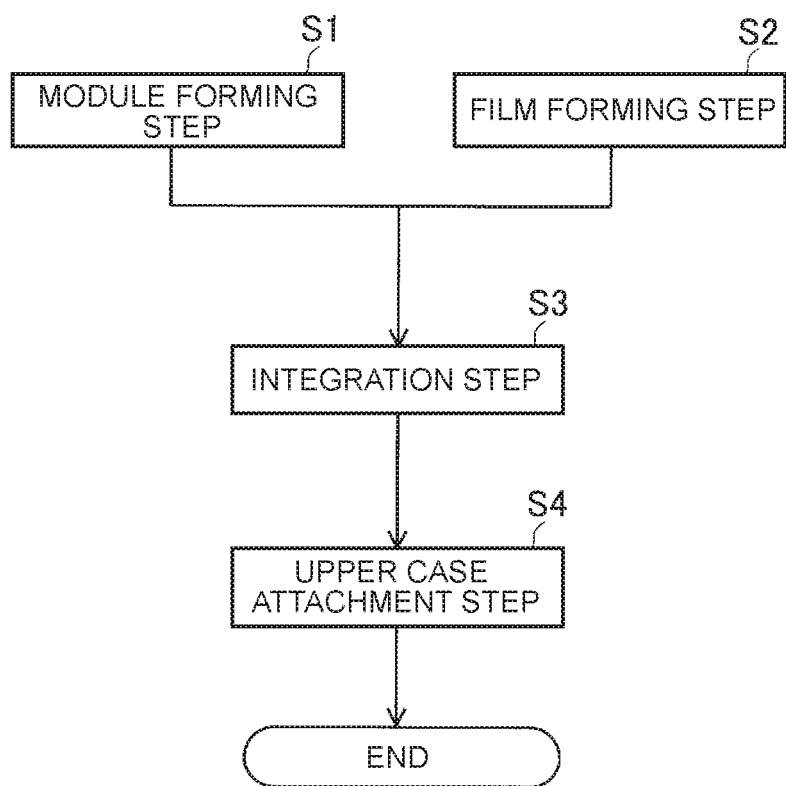
FIG. 6 is a flowchart of a manufacturing method of a battery pack according to the embodiment.

Further, the communicating-passage side wall portion 35$f$ has an uneven shape in which protrusion portions 35$f$1 and recess portions 35$f$2 extending from the bottom face 23$b$ side of the cell 21 toward the cooling surface 60$a$ side of the cooler 60 are arranged alternately in a stripe manner (see FIGS. 5A, 5B, and 5C). In the present embodiment, a width W1 of each protrusion portion 35$f$1 is set to W1=0.15 mm, a width W2 of each recess portion 35$f$2 is set to W2=0.15 mm, and a repetition distance P of the protrusion portions 35$f$1 is set to P=0.30 mm. Further, a depth D of the recess portion 35$f$2 based on the apex of the protrusion portion 35$f$1 is set to D=0.15 mm.

The end plates 29 are placed on the opposite sides in the arrangement direction BH so that the cells 21 and the intervening members 31 that are laminated on each other are sandwiched therebetween. The end plates 29 are provided with a plurality of fixing portions (not shown) via which the battery module 20 is fixed to the lower case 11 of the battery pack case 10 and are fixed to the lower case 11 together with the cooler 60 (described later) by use of stud bolts and nuts (not shown). Hereby, the battery module 20 is fixed to the lower case 11 in a state where the cooler 60 is sandwiched between the bottom faces 23$b$ of the cells 21 of the battery module 20 and the lower case 11.

Next will be described the cooler 60 (see FIGS. 1 to 3). The cooler 60 is placed below the battery module 20. The cooler 60 is made of aluminum and has a square tubular shape extending in the arrangement direction BH. The cooler 60 is configured such that a cooling medium RB (a cooling medium for an in-vehicle air conditioner, in the present embodiment) cooled to a predetermined temperature (10° C., in the present embodiment) circulates through the cooler 60. Further, a plate-shaped member 15 made of sponge having an excellent heat insulating property and extending in the arrangement direction BH is placed between the bottom face 60$b$ of the cooler 60 and the lower case 11 of the battery pack case 10.

The cooler 60 is provided with a plurality of fixing portions (not shown) via which the cooler 60 is fixed to the battery pack case 10. As described above, by use of stud bolts and nuts (not shown), the cooler 60 is fixed to the lower case 11 of the battery pack case 10 together with the battery module 20 with the plate-shaped member 15 being sandwiched therebetween. In such an assembled state, a distance KC between the bottom faces 23$b$ of the cells 21 and the cooling surface 60$a$ that is a top face, of the cooler 60, that extends in the arrangement direction BH is set to KC=1.8 mm.

The heat conductive layer 70 is a layer provided between the bottom faces 23$b$ of the cells 21 and the cooling surface 60$a$ of the cooler 60 so as to transmit heat of the cells 21 to the cooler 60. The heat conductive layer 70 is a layer made of a heat conductive viscous material 71 and having heat conductivity and viscosity, and more specifically, in the present embodiment, the heat conductive layer 70 is made of heat dissipation grease. The heat dissipation grease has a viscosity of 672 Pa·s and contains aluminum oxide ($Al_2O_3$) by 45 wt % to 50 wt %, zinc oxide (ZnO) by 17 wt % to 21 wt %, and grease-form silicon-based resin by 30 wt %.

The heat conductive layer 70 is filled into the communicating passage 35$k$ of the intervening member 31 without any gap and is also provided between the second intervening portion 35 of the intervening member 31 and the cooling surface 60$a$ of the cooler 60. Note that, in the heat conductive layer 70, a part filled in the communicating passage 35$k$ is also referred to as a communicating-passage inside part 70$p$, and a part provided between the second intervening portion 35 and the cooling surface 60$a$ is also referred to as a communicating-passage outside part 70$q$.

A layer thickness (a layer thickness in the communicating-passage inside part 70$p$) TD of the heat conductive layer 70 is equal to the distance KC (KC=1.8 mm) between the bottom face 23$b$ of the cell 21 and the cooling surface 60$a$ of the cooler 60, that is, TD=KC=1.8 mm is satisfied. The layer thickness TD is thicker than the second thickness T2 (T2=1.5 mm) of the second intervening portion 35 of the intervening member 31 (see FIG. 11). As will be described later, in the battery pack 1 of the present embodiment, no air bubble AR remains in the communicating-passage inside part 70$p$ of the heat conductive layer 70, so that a heat transfer amount Q (W) (of the heat conductive layer 70) between the bottom face 23$b$ of the cell 21 and the cooling surface 60$a$ of the cooler 60 is high.

Next will be described a manufacturing method of the battery pack 1 (see FIGS. 6 to 11). First, the cells 21, the intervening members 31, and the end plates 29 are prepared, and in a "module forming step S1," the battery module 20 is formed. More specifically, the cells 21 and the first intervening portions 33 of the intervening members 31 are arranged alternately, so that each of the first intervening portions 33 of the intervening members 31 is provided between corresponding cells 21 adjacent to each other and the bottom faces 23$b$ of the cells 21 are exposed in the communicating passages 35$k$ of the second intervening portions 35 of the intervening members 31. Further, the end plates 29 are laminated on the opposite sides in the arrangement direction BH so as to sandwich the cells 21 and the intervening members 31 therebetween. Then, while a laminated body obtained herein is being pressed in the arrangement direction BH, a restraint member (not shown) is provided over the end plates 29, 29 and the restraint member is fixed to the end plates 29, so that the cells 21 and the intervening members 31 are integrated with each other. Thus, the battery module 20 is formed.

Further, the cooler 60 is prepared separately, and in a "film forming step S2," the heat conductive viscous material 71 is discharged onto the cooling surface 60$a$ of the cooler 60 by use of a dispenser with a predetermined discharge amount, so that a heat conductive viscous film 70$x$ made of the heat conductive viscous material 71 is formed on the cooling surface 60$a$. Note that values of a width TW and a film thickness TM of the heat conductive viscous film 70$x$ (see FIG. 7) are values obtained when the communicating passage 35$k$ of the intervening member 31 is filled with the heat conductive viscous material 71 without any gap and the heat conductive viscous material 71 is also provided between the second intervening portion 35 of the intervening member 31 and the cooling surface 60$a$ of the cooler 60 at the time when the heat conductive layer 70 is formed by crushing the heat conductive viscous film 70x in an integration step S3 (described later).

In the present embodiment, in the communicating passage 35k of the intervening member 31, a maximum opening width W3 on the cooling surface 60a side of the cooler 60 is set to W3=25.0 mm and a minimum opening width W4 on the bottom face 23b side of the cell 21 is set to W4=24.8 mm. Further, a depth of the communicating passage 35k (the second depth T2 of the second intervening portion 35 of the intervening member 31) is set to T2=1.5 mm. In the meantime, the layer thickness TD of the heat conductive layer 70 formed in the integration step S3 (described later) is set to TD=1.8 mm. In view of this, the width TW of the heat conductive viscous film 70x is set to TW=23.0 mm that is smaller than the maximum opening width W3 of the communicating passage 35k and also smaller than the minimum opening width W4, and the film thickness TM of the heat conductive viscous film 70x is set to TM=2.0 mm that is thicker than the depth (the second thickness T2) of the communicating passage 35k and also thicker than the layer thickness TD of the heat conductive layer 70.

Subsequently, in the "integration step S3," the cells 21 of the battery module 20 and the cooler 60 are integrated with each other via the heat conductive layer 70. More specifically, the plate-shaped member 15 is positioned and put on the lower case 11 of the battery pack case 10. Further, the cooler 60 is positioned and put on the plate-shaped member 15. After that, the battery module 20 is positioned and put on the cooler 60. Then, the fixing portions (not shown) of the cooler 60 and the fixing portions (not shown) of the battery module 20 are fixed to the lower case 11 by use of stud bolts and nuts (not shown). Hereby, the distance KC between the bottom faces 23b of the cells 21 and the cooling surface 60a of the cooler 60 is set to KC=1.8 mm, so that the heat conductive layer 70 with the layer thickness TD that is set to TD=KC=1.8 mm is formed.

Figure 7:
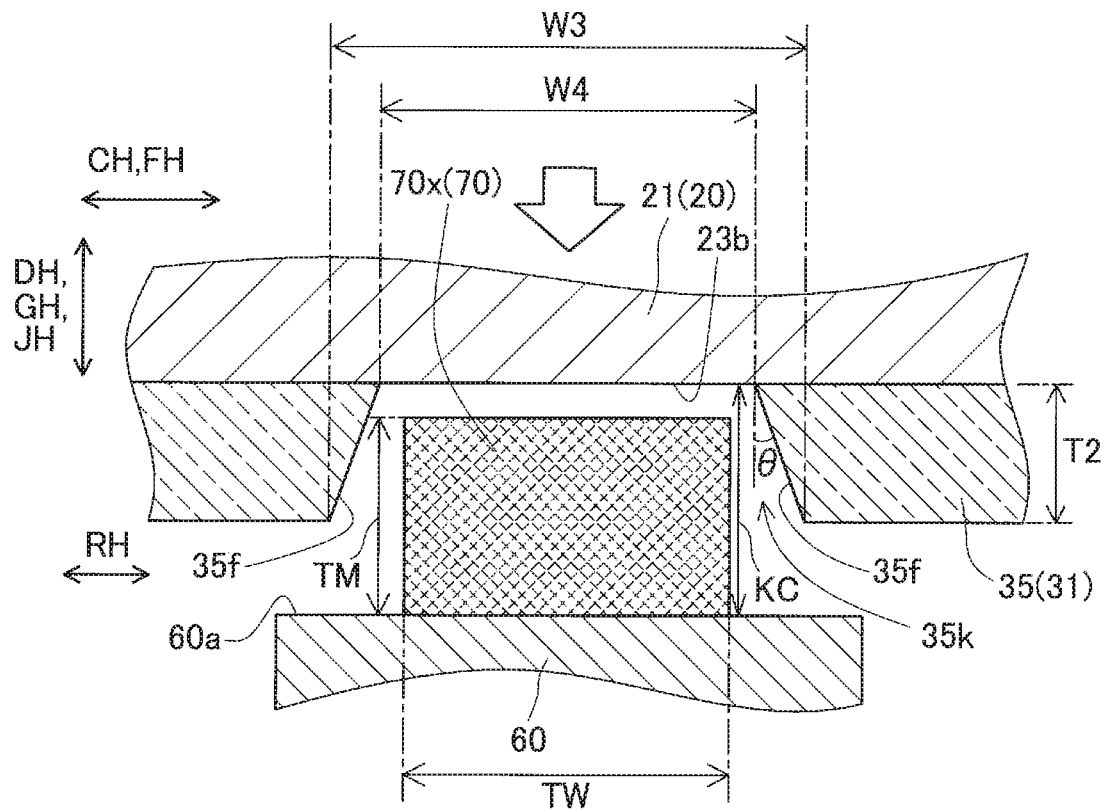
FIG. 7 is an explanatory view illustrating a state where a bottom face (a heat dissipation surface), of a cell, that is exposed in a communicating passage of the intervening member faces a heat conductive viscous film formed on a cooling surface of a cooler in an integration step of the manufacturing method of the battery pack according to the embodiment.

FIGS. 7 to 11 illustrate a state where the heat conductive viscous film 70x is crushed to deform so that the heat conductive layer 70 is formed in the integration step S3. FIG. 7 illustrates a state where the battery module 20 is put on the cooler 60 on which the heat conductive viscous film 70x is formed, in such a posture that the bottom face 23b, of the cell 21, that is exposed in the communicating passage 35k of the intervening member 31 faces the cooling surface 60a of the cooler 60. At this stage, the heat conductive viscous film 70x does not make contact with the bottom face 23b of the cell 21.

Figure 8:
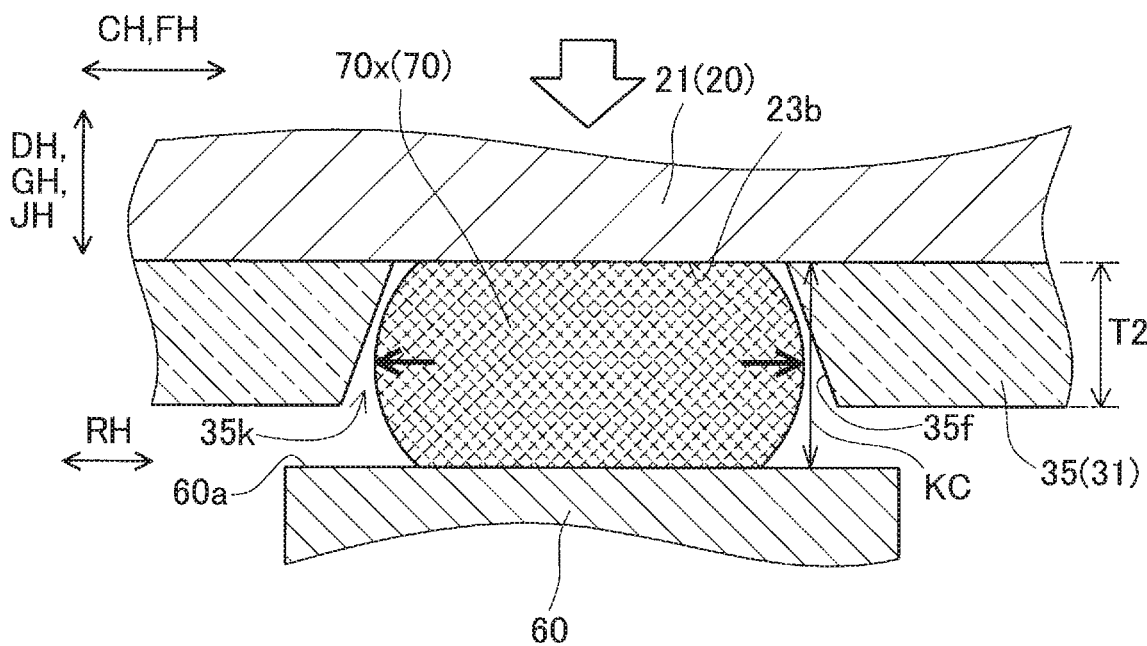
FIG. 8 is an explanatory view illustrating an original state where the heat conductive viscous film makes contact with the bottom surface of the cell in the integration step of the manufacturing method of the battery pack according to the embodiment.

When the distance KC between the bottom face 23b of the cell 21 and the cooling surface 60a of the cooler 60 is further narrowed, the heat conductive viscous film 70x makes contact with the bottom face 23b of the cell 21 as illustrated in FIG. 8, so that the heat conductive viscous film 70x is slightly crushed in the thickness direction (the same direction as the thickness direction JH of the second intervening portion 35) and a central part, in the thickness direction, of the heat conductive viscous film 70x swells outward. At this stage, the heat conductive viscous film 70x does not make contact with the communicating-passage side wall portions 35f of the second intervening portion 35 of the intervening member 31.

Figure 9:
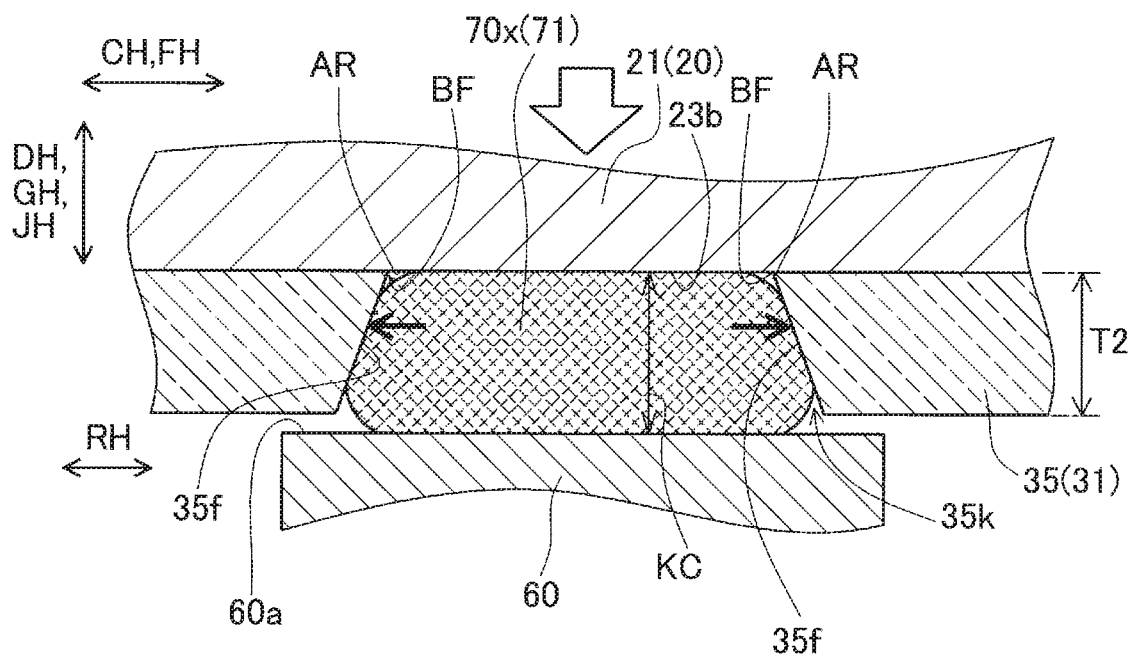
FIG. 9 is an explanatory view illustrating a state where the heat conductive viscous film also makes contact with a communicating-passage side wall portion of the intervening member in addition to the bottom surface of the cell in the integration step of the manufacturing method of the battery pack according to the embodiment.

When the distance KC between the bottom face 23b and the cooling surface 60a is further narrowed, the heat conductive viscous film 70x is further crushed in the thickness direction, so that the heat conductive viscous film 70x makes contact with the communicating-passage side wall portions 35f of the second intervening portion 35 of the intervening member 31, as well as the bottom face 23b of the cell 21, as illustrated in FIG. 9. At this time, since the central part, in the thickness direction, of the heat conductive viscous film 70x makes contact with the communicating-passage side wall portions 35f first, so that an air bubble AR may be left at corner parts BF between the bottom face 23b of the cell 21 and the communicating-passage side wall portions 35f of the intervening member 31.

Figure 10:
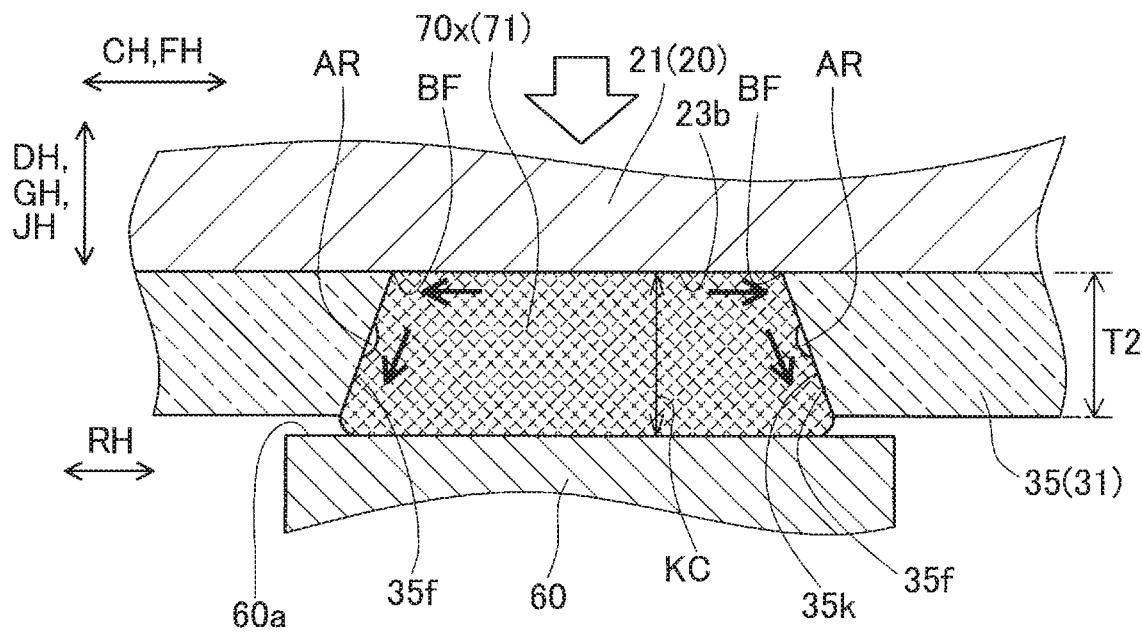
FIG. 10 is an explanatory view illustrating a state where a heat conductive viscous material moves toward the cooling surface side along the bottom face of the cell and the communicating-passage side wall portion of the intervening member in the integration step of the manufacturing method of the battery pack according to the embodiment.

When the distance KC between the bottom face 23b and the cooling surface 60a is further narrowed, the heat conductive viscous film 70x is further crushed in the thickness direction. As a result, as illustrated in FIG. 10, the heat conductive viscous material 71 making contact with the bottom face 23b of the cell 21 and the communicating-passage side wall portions 35f gradually moves toward the cooling surface 60a side of the cooler 60 along the bottom face 23b of the cell 21 and the communicating-passage side wall portions 35f. On this account, air bubbles AR left at the corner parts BF between the bottom face 23b of the cell 21 and the communicating-passage side wall portions 35f also gradually move toward the cooling surface 60a side along the communicating-passage side wall portions 35f, along with the movement of the heat conductive viscous material 71.

Figure 11:
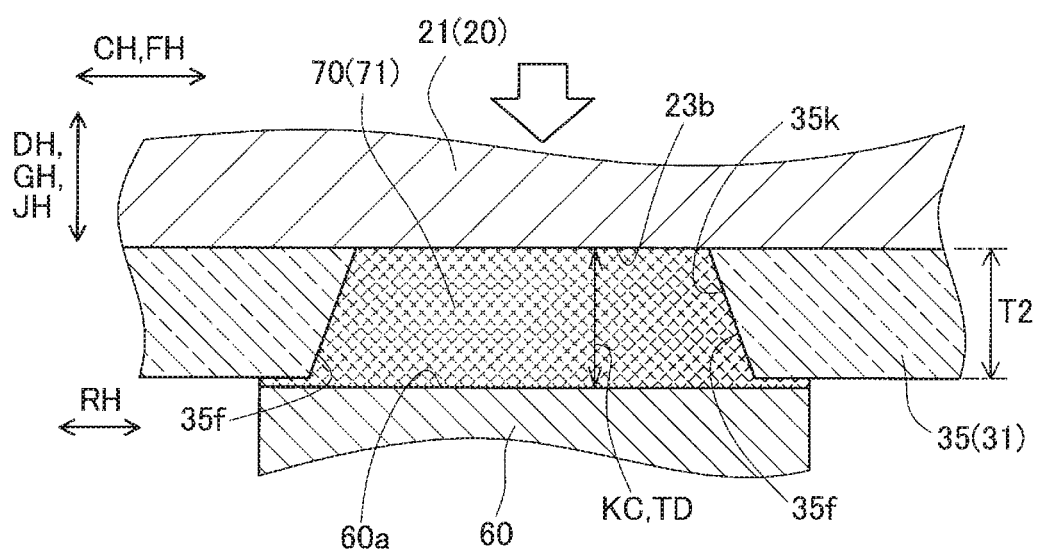
FIG. 11 is an explanatory view illustrating a state where the heat conductive viscous material is filled into the communicating passage without any gap and a heat conductive layer is formed in the integration step of the manufacturing method of the battery pack according to the embodiment.

When the distance KC between the bottom face 23b and the cooling surface 60a is further narrowed, the heat conductive viscous material 71 is filled into the communicating passage 35k without any gap, as illustrated in FIG. 11. Along with this, the heat conductive viscous material 71 partially protrudes from the communicating passage 35k and expands between the second intervening portion 35 of the intervening member 31 and the cooling surface 60a of the cooler 60. Thus, the heat conductive layer 70 is formed. Besides, the air bubbles AR left in the communicating passage 35k in the communicating-passage inside part 70p of the heat conductive layer 70 move to a part between the second intervening portion 35 of the intervening member 31 and the cooling surface 60a of the cooler 60 and are further pushed outside, so that the air bubbles AR can hardly stay in the communicating-passage inside part 70p.

Subsequently, in an "upper case attachment step S4," the upper case (not shown) is fixed to the lower case 11, so that the battery pack case 10 is formed. Thus, the battery pack 1 is completed.

EXAMPLES AND COMPARATIVE EXAMPLE

Next will be described results of tests performed to verify the effects of the disclosure. As Examples 1 to 6 and Comparative Example, seven types of battery packs were manufactured by changing the configuration of the communicating-passage side wall portion of the second intervening portion of the intervening member, as illustrated in Table 1. More specifically, in Comparative Example and Example 3, the communicating-passage side wall portion of the second intervening portion did not have a tapered shape. On the other hand, in Examples 1, 2, 4 to 6, the communicating-passage side wall portion of the second intervening portion was formed in a tapered shape having an inclination angle θ of 0.5° to 3.0°. In the meantime, in Examples 3 to 6, the communicating-passage side wall portion of the second intervening portion was formed in an uneven shape similar to the uneven shape constituted by the protrusion portions 35/1 and the recess portions 35/2 in the embodiment described above. Note that the battery pack of Example 6 corresponds to the battery pack 1 of the above embodiment.

TABLE 1

| | INCLINATION ANGLE θ (°) | PROTRUSION PORTIONS AND RECESS PORTIONS FORMED OR NOT | MAXIMUM TEMPERATURE (° C.) | EVALUATION |
|---|---|---|---|---|
| COMPARATIVE EXAMPLE | 0.0 | NOT FORMED | 35.0 | C |
| EXAMPLE 1 | 1.0 | NOT FORMED | 33.0 | B |
| EXAMPLE 2 | 3.0 | NOT FORMED | 34.0 | B |
| EXAMPLE 3 | 0.0 | FORMED | 33.2 | B |
| EXAMPLE 4 | 0.5 | FORMED | 31.4 | A |
| EXAMPLE 5 | 1.0 | FORMED | 30.9 | A |
| EXAMPLE 6 | 3.0 | FORMED | 29.5 | A |

Then, the battery packs of Examples 1 to 6 and Comparative Example were used under a predetermined condition. More specifically, while the cooling medium RB cooled off to 10° C. was circulated through the cooler 60, charge and discharge were repeated for 2000 sec such that the cells 21 included in the battery pack were discharged at a constant current of 3 C from SOC of 100% to SOC of 90%, and after that, the cells 21 were charged at a constant current of 3 C from SOC of 90% to SOC of 100%. Then, cell temperatures (° C.) of the top faces 23a of the cell cases 23 of the cells 21 included in the battery pack were measured. Note that the cell temperature was measured by use of a thermoelectric couple placed on the top face 23a of the cell case 23 of the cell 21.

Note that "MAXIMUM TEMPERATURE" in Table 1 is a cell temperature of the cell 21 having the highest temperature among the cells 21 included in one battery pack. In the test, based on the height of the maximum temperature, cooling performance of the battery pack was evaluated. More specifically, a battery pack with a maximum temperature of less than 32.0° C. was evaluated as particularly good (an evaluation mark "A"), a battery pack with a maximum temperature of equal to or more than 32.0° C. but less than 34.5° C. was evaluated as good (an evaluation mark "B"), and a battery pack with a maximum temperature of 34.5° C. or more was evaluated as poor (an evaluation mark "C").

Figure 12:
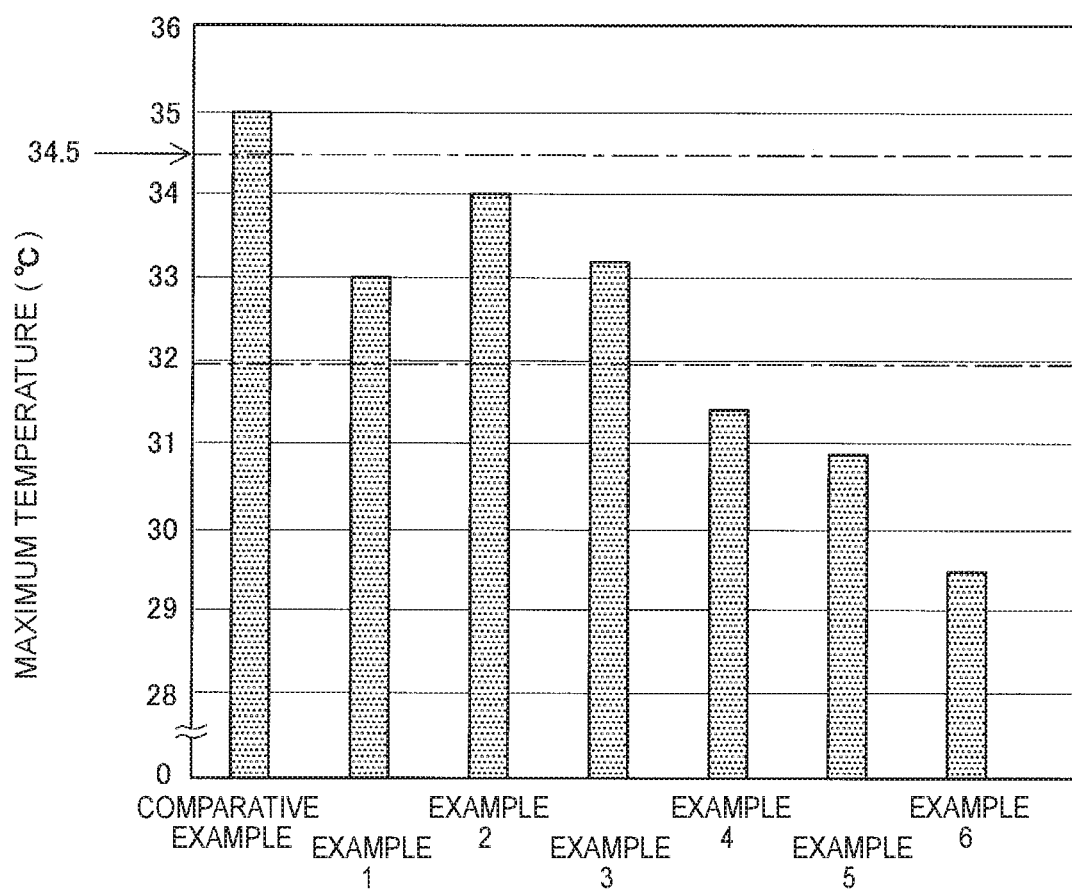
FIG. 12 is a graph illustrating a maximum temperature of a cell temperature at the time of cooling in terms of a battery pack of each of Examples 1 to 6 and Comparative Example.

The results are shown in Table 1 and FIG. 12. In the battery pack of Comparative Example, the maximum temperature was high (34.5° C. or more), so the cooling performance was poor. On the other hand, in the battery packs of Examples 1 to 6, the maximum temperature was low (less than 34.5° C.), so the cooling performance was good. Particularly, in the battery packs of Examples 4 to 6, the maximum temperature was low (less than 32.0° C.), so the cooling performance was good. A presumable reason why such results were obtained is as follows.

That is, in the battery pack of Comparative Example, the communicating-passage side wall portion of the second intervening portion of the intervening member did not have a tapered shape and also did not have an uneven shape. On this account, an air bubble AR left in the communicating passage 35k, particularly at the corner part BF between the bottom face 23b of the cell 21 and the communicating-passage side wall portion 35f of the intervening member 31 in the step of forming the heat conductive layer 70 remained in the communicating-passage inside part 70p of the heat conductive layer 70, so that the heat transfer amount Q of the heat conductive layer 70 was low (a heat dissipation property was low). As a result, it is considered that the maximum temperature of the cells 21 was high.

On the other hand, in the battery packs of Examples 1, 2, 4 to 6, the communicating-passage side wall portion of the second intervening portion of the intervening member was formed in the tapered shape. On this account, even if air bubbles AR were left in the communicating passage 35k, particularly at the corner part BF in the step of forming the heat conductive layer 70, the air bubbles AR moved toward the cooling surface 60a side along the bottom face 23b of the cell 21 and the communicating-passage side wall portion 35f formed in the tapered shape, along with the movement of the heat conductive viscous material 71 toward the cooling surface 60a of the cooler 60 along the bottom face 23b of the cell 21 and the communicating-passage side wall portion 35f formed in the tapered shape, so that the air bubbles AR were easily discharged outside the communicating passage 35k. Thus, the air bubbles AR left in the communicating-passage inside part 70p of the heat conductive layer 70 were fewer than the battery pack of Comparative Example, and the heat transfer amount Q of the heat conductive layer 70 was high. As a result, it is considered that the maximum temperature of the cells 21 was restrained to be low.

From those results, it is found that the inclination angle θ of the communicating-passage side wall portion of the intervening member should be set to 0.3° or more. When the inclination angle θ is less than 0.3°, it is considered that the air bubbles AR can hardly move along with the movement of the heat conductive viscous material 71, so that the air bubbles AR easily remain in the communicating-passage inside part 70p. In the meantime, the inclination angle θ of the communicating-passage side wall portion of the intervening member should be set to 4° or less. In a battery pack having a tapered shape with an inclination angle θ of larger than 4°, the heat conductive viscous material 71 can hardly move to the cooling surface 60a side, so it is considered that the air bubbles AR tend to remain in the communicating-passage inside part 70p. Accordingly, it is preferable that the communicating-passage side wall portion of the intervening member be formed in a tapered shape having an inclination angle θ of 0.3° to 4°.

In the meantime, in the battery packs of Examples 3 to 6, the communicating-passage side wall portion of the second intervening portion of the intervening member was formed in an uneven shape. On this account, in the integration step S3, the heat conductive viscous material 71 easily moved toward the cooling surface 60a side along the extending direction of the protrusion portions and the recess portions. That is, it is considered that the heat conductive viscous material 71 easily moved from the bottom face 23b of the cell 21 toward the cooling surface 60a side by providing the protrusion portions and the recess portions. Hereby, the air bubbles AR easily moved toward the cooling surface 60a side so as to be discharged outside the communicating passage 35k, along with the movement of the heat conductive viscous material 71 to the cooling surface 60a side. Thus, the air bubbles AR left in the communicating-passage inside part 70p of the heat conductive layer 70 were fewer than the battery pack of Comparative Example, and the heat transfer amount Q of the heat conductive layer 70 was high. As a result, it is considered that the maximum temperature of the cells 21 was restrained to be low.

Particularly, in Examples 4 to 6, the communicating-passage side wall portion of the intervening member had the tapered shape and the uneven shape. On this account, in the integration step S3, the heat conductive viscous material 71 further easily moved toward the cooling surface 60a side along the bottom face 23b of the cell 21 and the communicating-passage side wall portion 35f having the tapered shape and the uneven shape. Along with this, the air bubbles AR were further easily discharged outside the communicating passage 35k by further moving toward the cooling surface 60a side along the bottom face 23b of the cell 21 and the communicating-passage side wall portion 35f having the tapered shape and the uneven shape. Thus, the air bubbles AR left in the communicating-passage inside part 70p of the heat conductive layer 70 were further fewer than the battery packs of Examples 1 to 3, and the heat transfer amount Q of the heat conductive layer 70 was further higher. As a result, it is considered that the maximum temperature of the cells 21 was restrained to be particularly low.

As described above, the manufacturing method of the battery pack 1 includes the module forming step S1, the film forming step S2, and the integration step S3. The communicating-passage side wall portion 35f of the second intervening portion 35 of the intervening member 31 is formed at least in the tapered shape or the uneven shape. In the integration step S3, the heat conductive viscous film 70x is pressed against the bottom face 23b, of the cell 21, that is exposed in the communicating passage 35k of the intervening member 31, and the heat conductive viscous material 71 making contact with the bottom face 23b of the cell 21 and the communicating-passage side wall portion 35f having the tapered shape and the uneven shape is moved toward the cooling surface 60a side along the bottom face 23b of the cell 21 and the communicating-passage side wall portion 35f having the tapered shape and the uneven shape. On this account, even if the air bubbles AR are left in the communicating passage 35k, the air bubbles AR easily move toward the cooling surface 60a side along with the movement of the heat conductive viscous material 71, so that the air bubbles AR can hardly remain in the heat conductive viscous material 71 filled in the communicating passage 35k. On this account, it is possible to restrain the air bubbles AR from remaining in the communicating-passage inside part 70p of the heat conductive layer 70 and to restrain a decrease of the heat transfer amount Q of the heat conductive layer 70 due to the air bubbles AR.

In a case where the communicating-passage side wall portion 35f of the second intervening portion 35 of the intervening member 31 is formed to have the tapered shape and the uneven shape, it is possible to particularly restrain the air bubbles AR from remaining in the communicating-passage inside part 70p of the heat conductive layer 70 and to further restrain the decrease of the heat transfer amount Q of the heat conductive layer 70 due to the air bubbles AR.

Further, in the present embodiment, the communicating-passage side wall portion 35f of the intervening member 31 is formed in a tapered shape having an inclination angle θ of 0.3° to 4°. On this account, in the integration step S3, the heat conductive viscous material 71 further easily moves toward the cooling surface 60a side along the bottom face 23b of the cell 21 and the communicating-passage side wall portion 35f having the tapered shape, so that the air bubbles AR can hardly remain in the heat conductive viscous material 71 filled in the communicating passage 35k. Thus, it is possible to further restrain the air bubbles AR from remaining in the communicating-passage inside part 70p of the heat conductive layer 70 and to further restrain the decrease of the heat transfer amount Q of the heat conductive layer 70 due to the air bubbles AR.

The disclosure has been described above in line with the embodiment, but the disclosure also includes a case where the tapered shape is configured such that the sectional area of the communicating passage, in a direction perpendicular to the thickness direction of the second intervening portion, increases. The disclosure is not limited to the embodiment and can be modified and applied appropriately without departing from the gist of the disclosure.

What is claimed is:

1. A battery pack comprising:
   a battery module configured such that a plurality of cells and a plurality of intervening members are integrated with each other, the cells each including a heat dissipation surface, the intervening members each including a first intervening portion to be provided between corresponding cells adjacent to each other;
   a cooler configured to cool the cells via a cooling surface of the cooler; and
   a heat conductive layer including a heat conductive viscous material and provided between the heat dissipation surface and the cooling surface, wherein:
   the cells and the cooler contact the heat conductive layer;
   the intervening members each include a second intervening portion to be provided between the heat dissipation surface and the cooling surface;
   the second intervening portion has a thickness in a thickness direction from the heat dissipation surface to the cooling surface;
   the second intervening portion includes a communicating-passage side wall portion defining a communicating passage via which the heat dissipation surface communicates with the cooling surface;
   the communicating-passage side wall portion has at least one of a tapered shape and an uneven shape, the tapered shape being configured such that a sectional area of the communicating passage, in a direction perpendicular to the thickness direction of the second intervening portion, increases along a direction from the heat dissipation surface toward the cooling surface, the uneven shape being configured such that protrusion portions each extending from the heat dissipation surface toward the cooling surface and recess portions each extending from the heat dissipation surface toward the cooling surface are arranged alternately in a stripe manner;
   the heat conductive layer has a layer thickness that is equal to or more than the thickness of the second intervening portion; and
   the heat conductive layer is filled in at least the communicating passage, out of the communicating passage and a part between the second intervening portion and the cooling surface.

2. The battery pack according to claim 1, wherein:
   the cells are arranged in line;
   the cooling surface is configured to extend in an arrangement direction where the cells are arranged in line;
   the heat conductive layer is configured to transmit heat of the cells to the cooler; and
   the tapered shape is configured to be directed outward in a longitudinal direction of the second intervening portion along the direction from the heat dissipation surface toward the cooling surface.

3. The battery pack according to claim 2, wherein the communicating-passage side wall portion has the tapered shape and the uneven shape.

4. The battery pack according to claim 2, wherein the communicating-passage side wall portion has the tapered shape with an inclination angle of 0.3° to 4° from the thickness direction of the second intervening portion.

5. A manufacturing method of a battery pack, the manufacturing method comprising:
forming a battery module such that a plurality of cells and a plurality of intervening members are arranged alternately such that a first intervening portion of each of the intervening members is provided between the cells adjacent to each other and heat dissipation surface of the cell is exposed in communicating passage of the intervening member, and the cells and the intervening members are integrated with each other;
forming, on a cooling surface of a cooler, a heat conductive viscous film including a heat conductive viscous material and having a film thickness; and
forming a heat conductive layer such that the cells and the cooler contact the heat conductive layer, the heat conductive layer being formed such that the battery module is put on the cooler on which the heat conductive viscous film is formed, in such a posture that the heat dissipation surface exposed in the communicating passage faces the cooling surface, the heat conductive viscous film is pressed against the heat dissipation surface exposed in the communicating passage, and the heat conductive viscous material making contact with the heat dissipation surface and communicating-passage side wall portion of the intervening members is moved in a direction from the heat dissipation surface to the cooling surface along the heat dissipation surface and the communicating-passage side wall portion, such that the communicating passage is filled with the heat conductive viscous material, wherein:
the intervening members each include a second intervening portion to be provided between the heat dissipation surface and the cooling surface;
the second intervening portion has a thickness in a thickness direction from the heat dissipation surface to the cooling surface;
the second intervening portion includes the communicating-passage side wall portion defining the communicating passage via which the heat dissipation surface communicates with the cooling surface;
the communicating-passage side wall portion has at least one of a tapered shape and an uneven shape, the tapered shape being configured such that a sectional area of the communicating passage, in a direction perpendicular to the thickness direction of the second intervening portion, increases along a direction from the heat dissipation surface toward the cooling surface, the uneven shape being configured such that protrusion portions each extending from the heat dissipation surface toward the cooling surface and recess portions each extending from the heat dissipation surface toward the cooling surface are arranged alternately in a stripe manner;
the heat conductive layer has a layer thickness that is equal to or more than the thickness of the second intervening portion;
the heat conductive layer is filled in at least the communicating passage, out of the communicating passage and a part between the second intervening portion and the cooling surface; and
the film thickness is thicker than the layer thickness.

6. The manufacturing method of a battery pack according to claim 5, wherein:
the cells are arranged in line;
the cooling surface is configured to extend in an arrangement direction where the cells are arranged in line;
the heat conductive layer is configured to transmit heat of the cells to the cooler; and
the tapered shape is configured to be directed outward in a longitudinal direction of the second intervening portion along the direction from the heat dissipation surface toward the cooling surface.

7. The manufacturing method of a battery pack according to claim 6, wherein the communicating-passage side wall portion has the tapered shape and the uneven shape.

8. The manufacturing method of a battery pack according to claim 6, wherein the communicating-passage side wall portion has the tapered shape with an inclination angle of 0.3° to 4° from the thickness direction of the second intervening portion.

9. An intervening member used for a battery pack, the intervening member comprising:
a first intervening portion to be provided between adjacent cells, the cells each including a heat dissipation surface; and
a second intervening portion to be provided between the heat dissipation surface and a cooling surface of a cooler,
the second intervening portion including a communicating-passage side wall portion defining a communicating passage via which the heat dissipation surface communicates with the cooling surface through a heat conductive layer that contacts the heat dissipation surface and the cooling surface,
the communicating-passage side wall portion having at least one of a tapered shape and an uneven shape, the tapered shape being configured such that a sectional area of the communicating passage, in a direction perpendicular to a thickness direction of the second intervening portion, increases along a direction from the heat dissipation surface toward the cooling surface, the uneven shape being configured such that protrusion portions each extending from the heat dissipation surface toward the cooling surface and recess portions each extending from the heat dissipation surface toward the cooling surface are arranged alternately in a stripe manner.

10. The intervening member according to claim 9, wherein the tapered shape is configured to be directed outward in a longitudinal direction of the second intervening portion along the direction from the heat dissipation surface toward the cooling surface.

11. The intervening member according to claim 10, wherein the communicating-passage side wall portion has the tapered shape and the uneven shape.

12. The intervening member according to claim 10, wherein the communicating-passage side wall portion has the tapered shape with an inclination angle of 0.3° to 4° from the thickness direction of the second intervening portion.

\* \* \* \* \*